Figure 1:
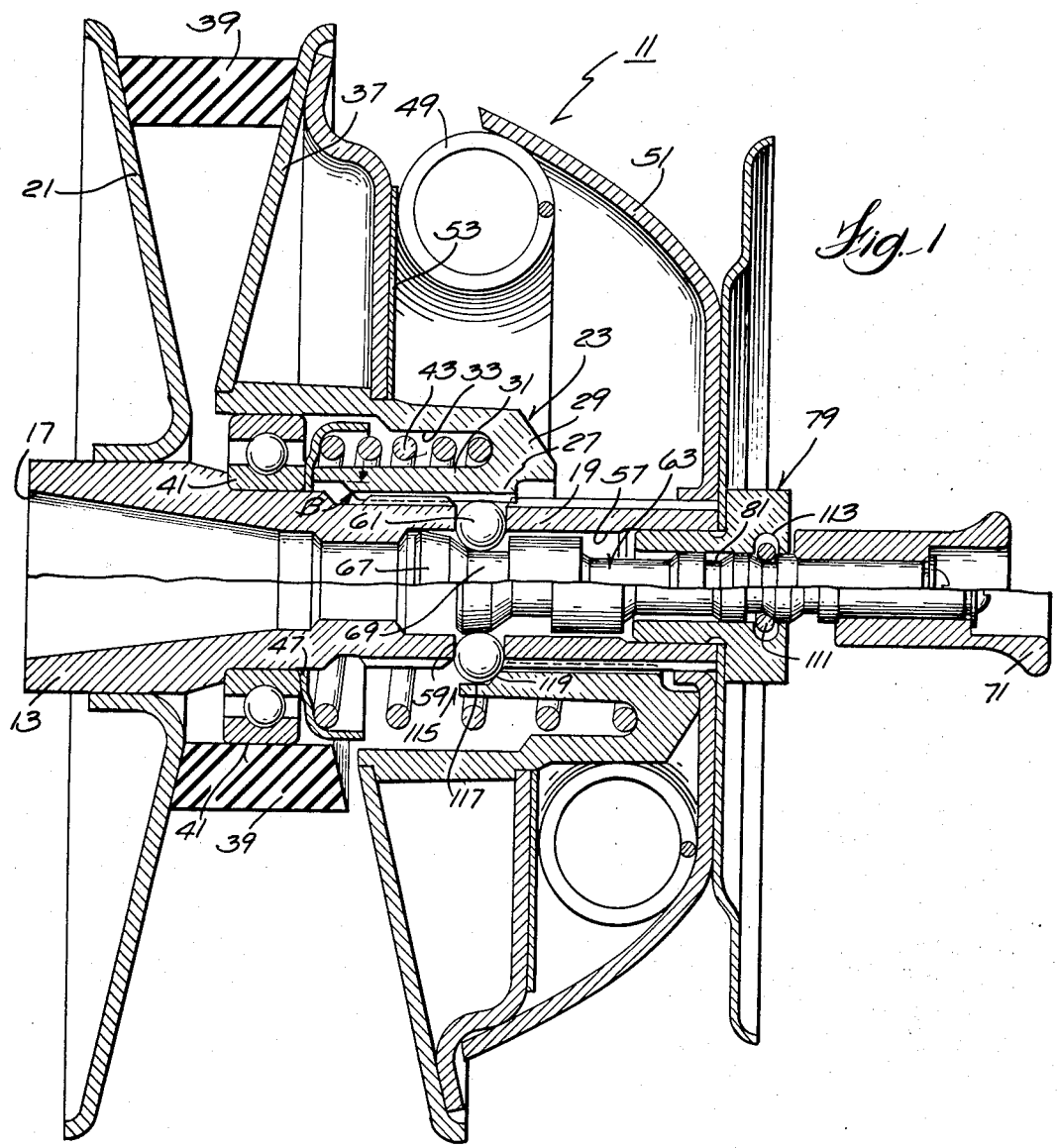

United States Patent [19]
Lassanske

[11] 3,709,052
[45] Jan. 9, 1973

[54] VARIABLE SPEED POWER TRANSMISSION WITH SNAP-IN CLUTCH

[75] Inventor: George G. Lassanske, Oconomowoc, Wis.

[73] Assignee: Outboard Marine Corporation, Waukegan, Ill.

[22] Filed: Sept. 10, 1971

[21] Appl. No.: 179,320

[52] U.S. Cl............74/230.17 E, 192/105 B, 192/114
[51] Int. Cl..............................................F16h 55/52
[58] Field of Search............74/230.17 R, 230.17 A, 230.17 B, 74/230.17 C, 230.17 E, 230. 17 M; 192/105 B, 105 C, 105 BA, 114, 103 A

[56] References Cited

UNITED STATES PATENTS

| | | | |
|---|---|---|---|
| 2,715,842 | 8/1955 | Homuth | 74/230.17 E |
| 2,790,525 | 4/1957 | Jaulmes | 74/230.17 E X |
| 3,362,242 | 1/1968 | Watkins | 74/230.17 |
| 2,937,730 | 5/1960 | Quennville | 192/103 A |

Primary Examiner—Milton Kaufman
Assistant Examiner—Frank H. McKenzie, Jr.
Attorney—Robert E. Clemency et al.

[57] ABSTRACT

Disclosed herein is a variable speed V-belt power transmission including an arrangement for automatically and rapidly initially engaging an axially movable sheave member with a V-belt in response to the attainment by the sheave member of an increased rotary speed above a minimum rotary speed at which subsequent continuing V-belt driving engagement can be maintained. Also disclosed herein are means for adjusting the power transmission so that initial engagement of the movable sheave member with the V-belt will occur at varying rotary speeds depending upon the adjustment.

12 Claims, 4 Drawing Figures

PATENTED JAN 9 1973

3,709,052

SHEET 1 OF 2

Inventor
George G. Lassanske
By Robert E. Clemency
Attorney

Inventor
George G. Sussanske
By Robert E. Clemency
Attorney

VARIABLE SPEED POWER TRANSMISSION WITH SNAP-IN CLUTCH

BACKGROUND OF THE INVENTION

The invention relates to power transmissions and more particularly to variable speed, V-belt transmissions. The invention also relates to clutch arrangements incorporated in such variable speed transmissions. Such transmissions are extensively used in all-terrain vehicles, golf carts, small trucks and snowmobiles.

In the past, clutching or initiation of drive engagement commonly occurred at relatively low speeds which were commonly about one-third to about one-half of the rate of rotation at which peak engine performance occurred. However, under high performance conditions, such as racing, it is desirable to initiate drive at higher engine speeds, while also permitting continued driving operating at engine speeds below the engine speed which is effective to initiate drive.

The invention constitutes a further development of the construction disclosed in the U.S. Watkins Pat. No. 3,362,242 entitled "Sheave Drive" and issued Jan. 9, 1968. Still more specifically, the invention additionally relates to power transmissions, such as disclosed in the U.S. Watkins Pat. No. 3,362,242, which transmissions include a power input shaft having fixed thereto a sheave flange, together with a sheave member mounted on the power input shaft for common rotary movement therewith and for axial movement relative thereto between a neutral position with the axially shiftable member remotely spaced from the relatively fixed flange at such distance as to prevent engagement with the V-belt, and a series of drive positions in engagement with the belt at distances from the relatively fixed flange less than the distance at the neutral position.

Such power transmissions also include a primary spring urging the axially movable sheave member toward the neutral position and a second biasing means which produces a force in proportion to the rate of rotation of the input shaft, and which, in opposition to the primary spring, urges the axially movable sheave member from the neutral position into a position of driving engagement with the V-belt. In operation, upon rotation of the input shaft above a preselected speed, the second biasing means overpowers the primary spring and causes sheave member movement to a drive position. Thereafter, variation in the input shaft rotation above the preselected speed effects variation in the net force urging the axially movable sheave member toward the relatively fixed flange so as to facilitate variation in the velocity of the driven V-belt.

In addition, such power transmissions have included manually operable blocking means movable relative to a blocking position for releasably preventing axial movement of the sheave member from the neutral position and toward a drive position. Such blocking means was operable to prevent sheave member movement from the neutral position, notwithstanding the rate of rotation of the input shaft and thereby provided a "- neutral lockout."

SUMMARY OF THE INVENTION

The invention provides an arrangement for effecting initial driving engagement of such power transmissions at higher speeds than heretofore, which speeds are above the minimum at which power transmission will occur subsequent to initial engagement. The arrangement disclosed herein for effecting initial driving engagement at higher speeds does not effect or interfere with the usual operation of such power transmissions to afford variation in the velocity of the belt transmitting power to the driven unit.

More specifically, the invention provides means operable, upon the development of an increased net force generated in response to input shaft rotation at an increased predetermined speed above the first mentioned predetermined speed, for applying such increased net force to the blocking means so as to displace the blocking means from the position preventing movement of the axially shiftable sheave member from the neutral position to a drive position in engagement with the belt.

The invention also provides, upon movement of the blocking means away from the blocking position, for application of the increased net force to the sheave member so as to obtain rapid axial movement of the sheave member from the neutral position into a position of driving engagement with the belt. Such operation provides a snap-in clutch action.

The invention further provides means of adjustable magnitude for opposing the action of the increased net force tending to displace the blocking means from the blocking position. Such means affords adjustment of the apparatus to afford regulation of the input shaft speed at which the sheave member automatically shifts from the neutral position to a drive position.

One of the principal objects of the invention is the provision of means for automatically effecting driving engagement of a variable speed V-belt transmission upon attainment of a relatively high input speed.

Another of the principal objects of the invention is the provision of means for automatically effecting movement of an axially shiftable sheave member from a neutral position to a drive position in engagement with a V-belt at an input shaft speed which is above the minimum input shaft speed effective to subsequently continue driving engagement with the belt.

Another of the principal objects of the invention is the provision of a power transmission including means affording initial driving engagement at differing preselectable input shaft speeds.

Another of the principal objects of the invention is the provision of a power transmission which is particularly adapted for high performance operation, as for instance, performance in a racing snowmobile.

Still another of the principal objects of the invention is the performance of a variable speed V-belt power transmission which is initially drivingly engaged at an input shaft speed above the minimum input shaft speed for continuing driving engagement.

Still another of the principal objects of the invention is the provision of a high performance power transmission which incorporates various of the features enumerated above, and which is economical to manufacture, and which will provide reliable performance over a long and useful life.

Still other objects and advantages of the invention will become known by reference to the following description and accompanying drawings.

DRAWINGS

FIG. 1 is a split, sectional side elevational view of one embodiment of a power transmission embodying various of the features of the invention. The upper half of FIG. 1 is illustrative of the arrangement of the components when the power transmission is in a drive position and the lower half is illustrative of the arrangement of the components when the transmission is in an idle or non-driving condition.

Figure 2:
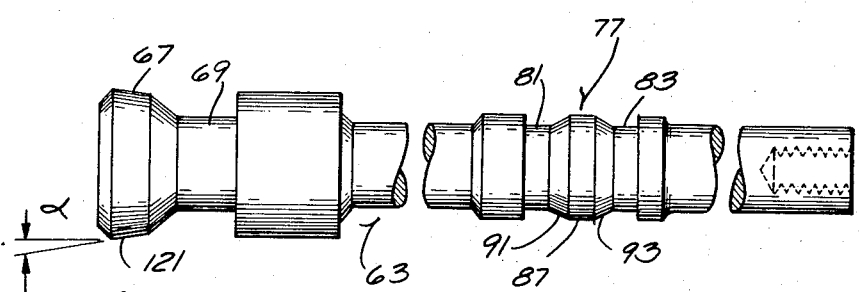

FIG. 2 is a fragmentary enlarged side elevational view of the plunger employed in the power transmission shown in FIG. 1.

Figure 3:
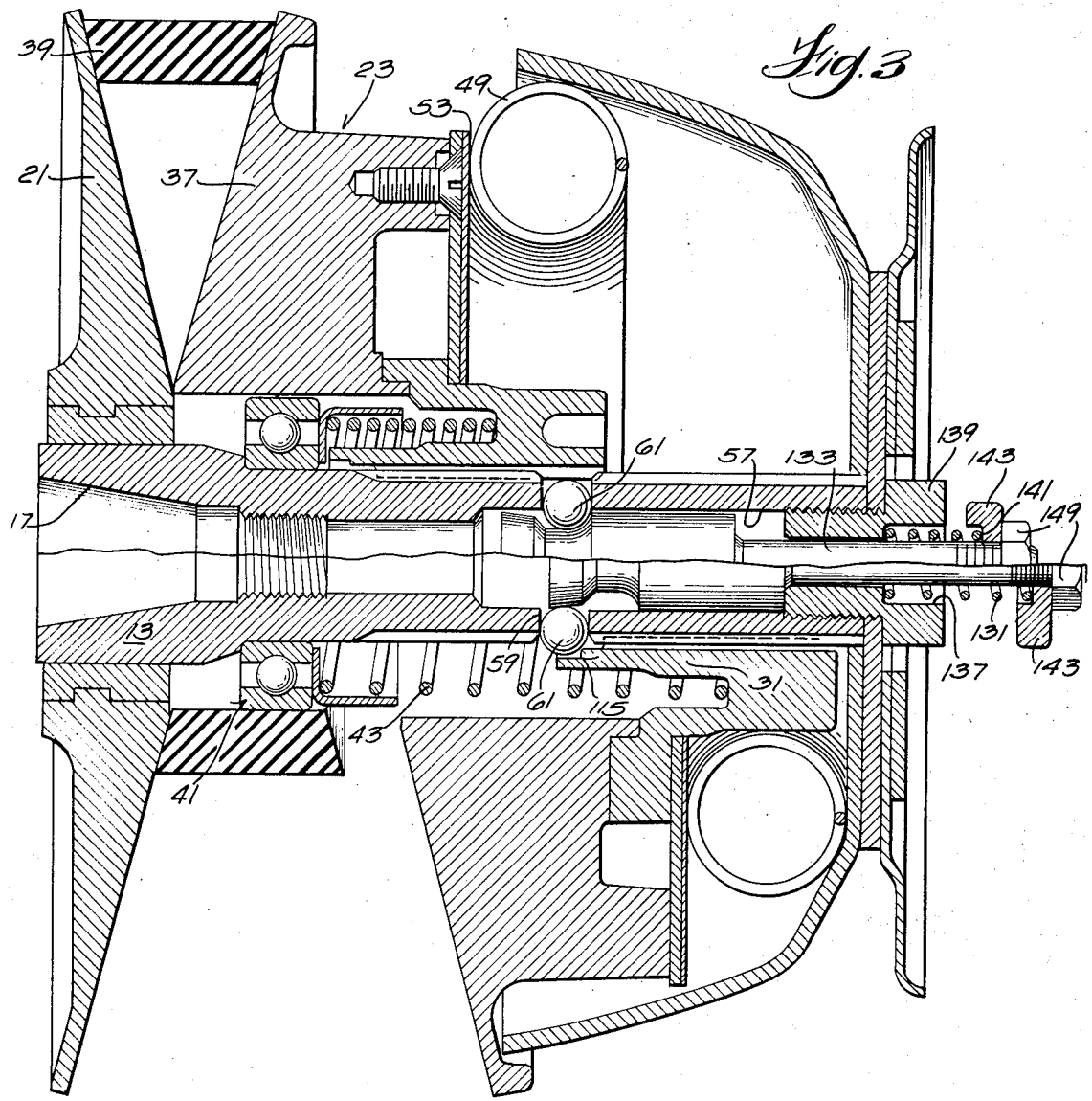

FIG. 3 is a split, sectional side elevational view of a second embodiment of a power transmission embodying various of the features of the invention. The upper half of FIG. 3 is illustrative of the arrangement of the components when the power transmission is in a drive position and the lower half is illustrative of the arrangement of the components when the transmission is in an idle or non-driving condition.

Figure 4:
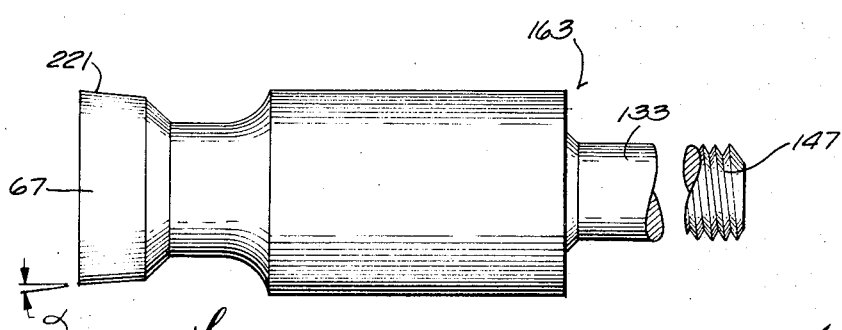

FIG. 4 is a fragmentary enlarged side elevational view of the plunger employed in the power transmission shown in FIG. 3.

Before explaining the invention in detail, it is to be understood that the invention is not limited in its application to the details of construction and arrangement of parts set forth in the following description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Shown in FIG. 1 is one embodiment of a power transmission 11 which embodies various of the features of the invention and which constitutes a further development of the power transmission disclosed in the U.S. Watkins Pat. No. 3,362,242 which issued Jan. 9, 1968, which is entitled "Sheave Drive," and which is incorporated herein by reference.

As disclosed in U.S. Pat. No. 3,362,242, the power transmission 11 includes a power input shaft 13 having an end portion 17 adapted to be connected to a suitable power source (not shown) and including a splined portion 19. Extending from the input shaft is a fixed sheave or flange 21.

Carried on the input shaft 13 for common rotary movement and for relative axial movement is a sheave member 23 with an internally splined portion 27 received on the externally splined portion 19 of the input shaft 13. The axial movable sheave member 23 also comprises a hub 29 including a sleeve 31 extending toward the fixed flange 21, i.e., to the left as seen in FIG. 1, together with means defining an annular, axially extending pocket 33 which is located radially outwardly of the sleeve 31 and which is open in the direction toward the fixed flange 21.

Also extending from the hub 29 for common movement therewith is a sheave or flange 37 which is located in facing relation to the fixed flange 21 and which, together with the sheave member 23 as a whole, is movable relative to the fixed flange 21 between a neutral or spaced position located remotely from the fixed flange 21, as shown in the bottom half of FIG. 1, and a second or drive position which is less spaced from the fixed sheave 21, as shown in the upper half of FIG. 1.

When the sheave member 23 is in the drive position shown in the upper half of FIG. 1, the power transmission 11 is in a drive condition with the flanges 21 and 37 in driving engagement with a transmission belt 39. When the axially movable sheave member 23 is in the spaced position shown in the bottom half of FIG. 1, the power transmission is in neutral and the transmission belt 39 rides on a bearing 41 carried on the power input shaft 13.

Biasing means are provided for urging the sheave member 23 toward the neutral or spaced position. In the absence of rotation of the input shaft 13 and the sheave member 23, such biasing means is effective to locate the sheave member 23 in the neutral or spaced position. While other constructions are possible, in the disclosed construction, such biasing means comprises a primary helical compression spring 43 which encircles the sleeve 31 and which, at one end, is seated in the pocket 33 and, at its other end, is seated against a spring stop 47 in the form of a shoulder or flange extending from the power input shaft 13. The biasing force of the primary spring 47 will, in the absence of an opposing force, maintain the sheave member 23 in the spaced position.

Other biasing means are provided for urging the sheave member 23 toward a drive position in response to rotation of the input shaft 13. While other constructions are possible, in the disclosed construction, such means comprises an annular garter spring 49 which encircles a portion of the sheave member 23 and which, in response to sheave member rotation, moves radially outwardly under the influence of centrifugal force. Such radially outward movement causes engagement by the garter spring 49 with a spring retainer or housing 51 which is fixed to the input shaft 13 and which is formed so as to cause displacement of the garter spring 49 toward the fixed sheave 21 in response to radially outward movement of the garter spring 49, and thereby to drivingly engage a portion 53 of the sheave member 23 so as to urge the sheave member 23 toward a drive position.

As a consequence, upon rotation of the input shaft 13, the garter spring 49 tends to expand radially outwardly and thereby generates a force which acts in opposition to the force of the primary biasing spring 43 and which varies proportionately with the rotational speed of the input shaft. When the rotation of the input shaft 13 reaches a first predetermined level, the force generated by the garter spring 49 overpowers the force of the primary spring 43, and provides a net or resultant force tending to displace the axially movable sheave member 23 toward a drive position. The magnitude of the net force increases in proportion to the increase in the rate of rotation of the input shaft 13 above the first predetermined level.

The power transmission 11 also includes blocking means for releasably preventing movement of the axially movable sheave member 23 from the spaced or neutral position to a drive position. While other arrangements could be employed, in the disclosed construction, such means includes an axial bore 57 in the input shaft 13 and at least one, and preferably a series of, radial apertures or bores 59 extending outwardly from the axial bore 57, together with respective blocking elements 61 which are located in the radial apertures 59 and which, in the specifically disclosed construction, constitute balls or spheres. The elements or balls 61 are movable radially between blocking positions extending partially outwardly from the radial apertures 59 into locations blocking movement of the axially movable sheave member 23 from the spaced or neutral position to a drive position, and retracted positions located at least partially in the radial apertures 59 and wholly radially inwardly or clear of the sleeve 31, whereby the sheave member 23 is free to move from the spaced or neutral position to a drive position under the influence of the net force.

The blocking means for releasably preventing movement of the sheave member 23 from the spaced position to a drive position also includes a part or plunger 63 which is located in the axial bore 57 and which, as also shown in FIG. 2, includes, at its outer end, a portion 67 which, when engaged with the elements 61, locates the elements 61 in their extended or blocking positions. Inwardly of the outer end portion 67, the plunger 63 further includes a recessed portion 69 which affords entry therein of the blocking elements 61 when the blocking elements are in their retracted positions permitting axial movement of the sheave member 23 from the spaced or neutral position to a drive position. On the outer end of the plunger 63 is a so-called "neutral lockout" knob 71.

The plunger 63 is movable in the axial bore 57 between a withdrawn or blocking position with the outer end portion 57 radially aligned with and in engagement with the elements 61 so as to locate the elements in their blocking position (shown in the lower half of FIG. 1) and an inserted or release position (shown in the upper half of FIG. 1) in which the recess portion 69 is located in radial alignment with the elements 61, thereby permitting movement of the elements 61 to their retracted positions and axial movement of the sheave member 23 from the spaced or neutral position to a drive position.

The blocking means for releasably preventing movement of the sheave member 23 from the spaced or neutral position, shown in the lower half of FIG. 1, also includes a plunger detent mechanism or means for releasably retaining the plunger in one or both of the inserted or release position and the withdrawn or blocking position. While various constructions can be employed, as for instance, as shown in the U.S. Watkins Pat. No. 3,362,242, in the illustrated construction, such releasable retention means comprises formation of the plunger 63 with a reduced diameter shank portion 77 which is slidably received in an end cap 79 threaded into the outer end of the axial bore 57 in the input shaft 13. Included in the reduced diameter plunger portion 77 are two axial spaced, inner and outer recesses 81 and 83 which are respectively associated with the inserted or release position of the plunger 63 and with the withdrawn or blocking position of the plunger.

The inner and outer recesses 81 and 83 are spaced from each other at an axial distance equal to the axial travel of the plunger 63 between the blocking or withdrawn position and the inserted or release position and are formed, in part, by a central ridge 87 which can include a cylindrical intermediate portion 89 and by two oppositely extending and oppositely inclined camming or conical surfaces 91 and 93.

The detent mechanism or means for releasably retaining the plunger 63 in one or both of the inner and outer recesses 81 and 83, further includes another garter spring 111 which is, at least in part, located in an enlarged annular groove 113 in the end cap 79 and which is pretensioned so as to normally snuggly engage one of the inner and outer recesses 81 and 83. As a consequence, the garter spring 111 provides a force restraining axial shifting of the plunger 63 between its withdrawn or blocking position and the inserted or release position. If desired, the inner recess 81 associated with the inserted position can be omitted and still obtain various of the features of the invention.

Radially outward movement of the elements or balls 61 beyond their blocking positions is limited by formation on the sleeve 31 of an annular seat 115 which includes a cylindrical surface 117 and an inclined surface 119. Engagement of the blocking elements or balls 61 against the seat 115 prevents axial movement of the sheave member 23 from the spaced position to a drive position.

As thus far described, the construction is not materially different from the construction disclosed in the U.S. Watkins Pat. No. 3,362,242.

Except as described hereinafter, the construction shown in FIG. 3 is, to the extent above described, substantially the same as that shown in FIG. 1 and the same numberals which have been applied to the FIG. 1 construction have also been applied to the applicable components of the FIG. 3 construction.

In accordance with the invention, means are provided for causing the previously explained net force to be applied to the blocking means so as to displace the blocking means from the blocking position. While various arrangements can be employed, in the illustrated construction, the net force is applied in opposition to the means for releasably retaining the plunger 63 in the blocking position and so as to overcome the plunger retaining means and cause movement of the plunger 63 to the release or inserted position affording movement of the sheave member 23 from the spaced or neutral position to a drive position when the net force exceeds the restraining force applied by the plunger retaining means.

While other constructions can be employed, in the disclosed construction, such net force applying means utilizes the seat 115 on the sleeve 31, the elements or balls 61, and further includes the formation of the plunger outer end portion 67 with an inclined surface 121 which tapers radially outwardly and to the left as shown best in FIG. 2 at an angle $\alpha$ to provide a ball engaging alpha surface which, when the plunger 63 is in the blocking or withdrawn position, retains the balls 61 in blocking position and which simultaneously affords transmission from the seat 115 and through the balls 61 to the plunger 63 of a force which is proportional to the previously explained net force and which tends to displace the plunger 63, in opposition to the restraining force provided by the detent mechanism or plunger retaining means, to the left from the withdrawn or blocking position to the inserted or release position.

The magnitude of the power input shaft speed which is effective to cause the restraining force of the detent mechanism to be overpowered by the net force can be varied by varying the angle of the alpha surface 121 and by varying the angular inclination of the inclined surface 119 of the seat 115. While in the specifically disclosed construction, the alpha angle is 10°, if the angle alpha is increased, a force sufficient to overcome the detent mechanism restraining force will be transmitted to the plunger 63 at a slower input speed. On the other hand, if the alpha angle is decreased, a greater rotational speed of the power input shaft will be required to overpower the detent mechanism restraining force.

Similarly, if the angle beta formed between the inclined surface 119 and the cylindrical surface 117 of the sleeve 31 is reduced, a greater force will be transmitted to the plunger 63 at the same power input shaft speed and therefor a slower power input shaft speed will be effective to overcome the restraining force of the detent mechanism. Contrariwise, if the beta angle is increased, a faster power input shaft speed will be required to overcome the restraining force of the detent mechanism. In the specifically disclosed construction, the angle beta is approximately 45°. Thus, it will be seen that in the illustrated construction, the included angle formed between the alpha surface 121 and the inclined surface 119 is approximately 35°. Preferably, the included angle between the alpha surface 121 and the inclined surface 119 is less than about 45°.

In operation of the power transmission 11 illustrated in FIGS. 1 and 2, the plunger 63 can be manually set against the action of the detent mechanism in either of the withdrawn or blocking position preventing transfer of power through the power transmission 11 or in the inserted or release position permitting power transfer. When the plunger 63 is in the inserted or release position, the power transmission 11 will operate essentially as described in the U.S. Watkins Pat. No. 3,362,242, i.e., whenever the input shaft speed is sufficiently great so as to cause overpowering of the primary spring 43 by the garter spring 49, the sheave member 23 will move from the spaced or neutral position to a drive position. The ultimate particular drive position will, of course, depend upon the speed of the power input shaft and will occur in accordance with the well known operation of a variable speed, sheave transmission.

When the plunger 63 is located in the withdrawn or blocking position, rotation of the input power shaft 13 at a rate which is merely otherwise sufficient to provide a net force effective to move the sheave member 23 to a drive position will not be effective to overpower the restraining force of the detent mechanism. However, upon further increase in the input shaft speed, the before mentioned net force will proportionately increase with increasing speed and will eventually cause overpowering of the restraining force which is produced by the detent mechanism and which releasably retains the plunger 63 in the blocking position. Upon the occurrence of such an increased net force, the plunger 63 will automatically move to the release position, thereby permitting movement of the sheave member 23 away from the spaced or neutral position. Immediately thereupon, the sheave member 23 will rapidly move from the spaced or neutral position to a drive position under the impetus of the increased net force and independently of any restraint by the detent mechanism. As the sheave member 23 moves axially relatively rapidly, the power transmission 11 is thus provided with a snap-in clutch feature at a higher input shaft speed than theretofore available. Upon subsequent sufficient decrease in input shaft speed, the sheave member 23 will again move to the neutral or spaced position under the influence of the primary spring 43. If subsequent drive initiation is to occur at relatively high input shaft speed with snap-in clutch action, the plunger 63 must be manually re-positioned in the withdrawn or blocking position.

The embodiment shown in FIGS. 3 and 4 differs essentially from the construction shown in FIGS. 1 and 2 in that, in the FIGS. 3 and 4 embodiment, a somewhat different structure is provided for the means for releasably retaining the plunger in the withdrawn or blocking position and, in that, means are provided for adjusting the magnitude of the restraining force provided by the blocking means. More specifically, means are additionally provided for adjusting the magnitude of the restraining force provided by the means for releasably retaining the plunger in the withdrawn or blocking position.

Still more specifically, means are provided in the power transmisstion 11 shown in FIGS. 3 and 4 for releasably preventing movement of the sheave member 23 away from the spaced or neutral position. As in the FIGS. 1 and 2 construction, such sheave member movement preventing means includes a plunger 163 which is formed to include an alpha surface 221, a series of balls 61 located in radial bores 59, and the seat 115 on the sleeve 31. In addition, such sheave member movement preventing means further includes means for releasably retaining the plunger 163 in the withdrawn or blocking position. Such plunger retaining means comprises biasing means providing a plunger retaining force urging the plunger 163 toward the extended or withdrawn or blocking position. In further accordance with the invention, such plunger retaining means also includes means for adjustably varying the magnitude of the biasing means or plunger retaining force.

Thus, in the specific construction illustrated in FIGS. 3 and 4, there is provided a helical compression spring 131 which encircles a shank portion 133 of the plunger 163. At one end, the helical spring 131 is seated in a blind bore 137 in a cap 139 threaded in the adjacent end of the input shaft axial bore 57. At its other end, the helical spring 131 is seated in a blind bore 141 in an adjusting nut 143 on a threaded end portion 147 of the plunger shank portion 133. Means are also provided for releasably securing the adjusting nut 143 in adjusted position. In the illustrated construction, such locking means comprises a lock nut 149 located on the threaded portion 147 exteriorly of the adjusting nut 143.

The helical spring 131 provides a restraining force which urges the plunger 163 to the right in FIGS. 3 and 4 and toward the withdrawn or blocking position. Adjustment of the nut 143 and lock nut 149 affords variation in the magnitude of such restraining force and, thus affords variation in the input shaft speed which is effective to overpower the restraining force and cause relatively rapid movement of the sheave member 23 from the spaced or neutral position to a drive position.

In the embodiment disclosed in FIGS. 3 and 4, after initiation of driving engagement, when the input shaft speed is reduced below the predetermined level which is effective to produce a net force in opposition to the force of the primary spring 43, the primary spring 43 overpowers the garter spring 49 and the sheave member 23 moves to the right to the spaced or neutral position. Upon completion of such movement, the restraining force of the helical spring 131 will cause the plunger 163 to automatically move to its outer or blocking position which locates the balls 61 in the blocking position and prevents power transfer through the transmission 11. However, whenever the input shaft speed subsequently advances sufficiently to provide an increased net force effective to overcome the restraining force of the helical spring 131, the plunger 163 will automatically move to the inserted or release position in response to the application of the increased net force, and the sheave member 23 will snap into a drive position in a relatively rapid movement under the influence of the increased net force and without opposition from the restraining force generated by the helical spring 131. Thus, manual resetting of the plunger 163 as in the embodiment of FIGS. 1 and 2 is not required to afford high speed initial drive engagement and snap-in clutch action.

Various of the features of the invention are set forth in the following claims.

What is claimed is:

1. A power transmission comprising a shaft adapted for connection to a power source and having a splined portion, a first member fixed to said shaft and having a flange, a second member having a flange and a splined portion slidably engaged on said splined shaft portion with said second member flange in facing relation to said first member flange and for axial movement of said second member on said shaft between a first position with said second member flange at a first spacing from said first member flange and a second position with said second member flange at a greater spacing from said first member flange, first biasing means urging said second member toward said second position and effective, in the absence of rotation of said shaft, to locate said second member in said second position, second biasing means urging said second member toward said first position in response to rotation of said shaft, said first biasing means being overpowered by said second biasing means upon rotation of said shaft above a predetermined speed, whereby upon rotation above said predetermined speed there is provided, in response to variation in the rate of rotation of said shaft, a variable net force urging said second member toward said first position, blocking means movable to a blocking position for releasably preventing axial movement of said second member from said second position and toward said first position, and means for applying said net force to said blocking means so as to displace said blocking means from said blocking position.

2. A power transmission in accordance with claim 1 and further including third biasing means releasably retaining said blocking means in said blocking position preventing axial movement of said second member from said second position and toward said first position, said third biasing means being overpowered by said net force when said net force exceeds a predetermined force level, whereupon said blocking means moves from said position preventing axial movement of said second member from said second position and toward said first position and immediately thereafter said second member moves toward said first position in response to the action of said net force and independently of the action of said third biasing means.

3. A power transmission is accordance with claim 2 including means for adjustably varying the bias exerted by said third biasing means whereby the rotational speed of said second member which is effective to cause overpowering of said third biasing means will vary in accordance with the adjustment of said third biasing means.

4. A power transmission in accordance with claim 3 wherein said blocking means comprises an element movable radially to and from said blocking position in the path of said second member movement and a part movable between a first position locating said blocking element in said blocking position and a second position permitting movement of said blocking element from said blocking position.

5. A power transmission in accordance with claim 4 wherein said third biasing means urges said part toward said first position.

6. A power transmission in accordance with claim 1 wherein said blocking means comprising means in said shaft defining an axial bore, means in said shaft defining a radial aperture communicating with said bore, a ball partially located in said aperture and movable between a blocking position in the path of movement of said second member from said second position and a retracted position clear of the path of said second member from said second position, a plunger movable in said bore between a blocking position preventing movement of said ball from said blocking position and a release position permitting movement of said ball to said retracted position, and spring means for releasably retaining said plunger in said blocking position.

7. A power transmission in accordance with claim 6 wherein said spring means comprises a helical spring encircling said plunger and urging said plunger toward said blocking position.

8. A power transmission in accordance with claim 7 and further including means for adjusting the force exerted by said spring means.

9. A power transmission in accordance with claim 8 wherein said means for adjusting the force exerted by said spring means comprises a threaded portion on said plunger, an adjusting nut on said threaded portion in engagement with one end of said helical spring, whereby variation of the location of said adjusting nut on said plunger varies the magnitude of the force exerted by said helical spring, and means for releasably securing said adjusting nut in adjusted position.

10. A power transmission in accordance with claim 9 wherein said means for releasably securing said adjusting nut in adjusted position comprises a lock nut on said threaded portion.

11. A power transmission in accordance with claim 6 wherein said net force applying means comprises said ball, means on said second member defining a seat engaged by said ball when said second member is in said second position and said ball is in said blocking position, said seat including an inclined surface in engagement with said ball, and a portion on said plunger which engages said ball when said plunger is in said blocking position and said ball is in said blocking position, said plunger portion including an inclined surface in engagement with said ball.

12. A power transmission in accordance with claim 11 wherein projections of said seat surface and said plunger surface form an acute angle of less than about 45°.

* * * * *